(12) United States Patent
Lurk et al.

(10) Patent No.: US 9,291,273 B2
(45) Date of Patent: Mar. 22, 2016

(54) BUTTERFLY VALVE ASSEMBLY

(71) Applicant: Bray International, Inc., Houston, TX (US)

(72) Inventors: Michael James Lurk, Sainte Genevieve, MO (US); Thomas Linhorst, Perryville, MO (US)

(73) Assignee: Bray International, Inc., Houston, TX (US)

( * ) Notice: Subject to any disclaimer, the term of this patent is extended or adjusted under 35 U.S.C. 154(b) by 0 days.

(21) Appl. No.: 14/487,902

(22) Filed: Sep. 16, 2014

(65) Prior Publication Data

US 2015/0076384 A1    Mar. 19, 2015

Related U.S. Application Data

(60) Provisional application No. 61/878,450, filed on Sep. 16, 2013.

(51) Int. Cl.
*F16K 1/22* (2006.01)

(52) U.S. Cl.
CPC ........... *F16K 1/224* (2013.01); *Y10T 29/49412* (2015.01); *Y10T 137/0525* (2015.04)

(58) Field of Classification Search
CPC ........... F16K 1/224; F16K 1/22; F16K 1/225; Y10T 29/49412; Y10T 137/0525; Y10T 137/6028
USPC ................... 251/305–308; 137/15.25, 315.16
See application file for complete search history.

(56) References Cited

U.S. PATENT DOCUMENTS

| | | | |
|---|---|---|---|
| 2,994,342 A | 8/1961 | Stillwagon | |
| 3,143,132 A | 8/1964 | Pangburn | |
| 3,192,945 A * | 7/1965 | Blakeley | F16K 1/22 251/308 |
| 3,384,340 A * | 5/1968 | Fawkes | F16K 1/22 251/308 |
| 3,399,863 A * | 9/1968 | Fawkes | F16K 1/22 251/308 |

(Continued)

OTHER PUBLICATIONS

FMC Technologies, Inc., Actuators, Jul. 10, 2013, 1 page, FMC Technologies, Inc., United States.

(Continued)

*Primary Examiner* — John Bastianelli
(74) *Attorney, Agent, or Firm* — Mark A. Oathout; Oathout Law Firm

(57) ABSTRACT

A valve assembly has a valve body, a lower bushing, a valve seat, a lower stem, a disc, and an upper stem. The valve body defines a bi-directional flow path therethrough; wherein the valve body has an inner surface, two flange faces, and further defines an upper orifice and a hemispherical lower orifice along an axis perpendicular to the flow path. The lower bushing is housed in the lower orifice, and the lower bushing is configured to tilt within the lower orifice away from the axis. The lower bushing defines a bushing cavity. The valve seat has an outer surface configured to encapsulate the inner surface and the two flange faces of the valve body. The lower stem is housed in the bushing cavity, and the lower stem is configured for tilting away from and towards the axis perpendicular to the flow path. The disc has a seating surface on at outer circumference, defines a stem receptacle to house the lower stem, and the stem receptacle extends less than a diameter of the disc.

7 Claims, 17 Drawing Sheets

(56) References Cited

U.S. PATENT DOCUMENTS

| | | | |
|---|---|---|---|
| 3,531,075 A * | 9/1970 | Kitazawa | F16K 1/22 251/306 |
| 3,596,876 A * | 8/1971 | Scaramucci | F16K 1/2263 251/308 |
| 3,601,360 A | 8/1971 | Scaramucci | |
| 3,656,714 A | 4/1972 | Peterson | |
| 4,010,775 A * | 3/1977 | Roberts | F16K 1/22 251/308 |
| 4,289,297 A | 9/1981 | Nakanishi | |
| 4,634,094 A * | 1/1987 | Geiser | F16K 1/24 251/308 |
| 4,699,357 A | 10/1987 | Sisk | |
| 5,207,411 A | 5/1993 | Sisk | |
| 5,632,304 A * | 5/1997 | Kempka | F02D 9/06 251/308 |
| 5,711,510 A | 1/1998 | Stary | |
| 5,741,006 A | 4/1998 | Murai et al. | |
| 6,142,173 A | 11/2000 | Bekeredjian et al. | |
| 7,090,193 B2 | 8/2006 | Kamesawa | |
| 8,161,996 B2 | 4/2012 | Barker et al. | |

OTHER PUBLICATIONS

FMC Corporation, FMC's Weco Butterfly Valve, Aug. 10, 1999, 1 page, FMC Corporation, Stephenville, TX, United States.

Bulk Tank, Inc., Introducing MAXXLIFE, Oct. 4, 2011, 2 pages, Bulk Tank, Inc., Park Hills, MO, United States.

Cameron, Demco Butterfly Valves, Jul. 10, 2013, 1 page, Cameron, United States.

Bray Controls, Standard Series 40/41 Bray McCannalok, Aug. 1, 2012, 2 pages, Bray Controls, United States.

Bray Controls, Standard Series 44/45 Bray McCannalok, Aug. 1, 2012, 2 pages, Bray Controls, United States.

* cited by examiner

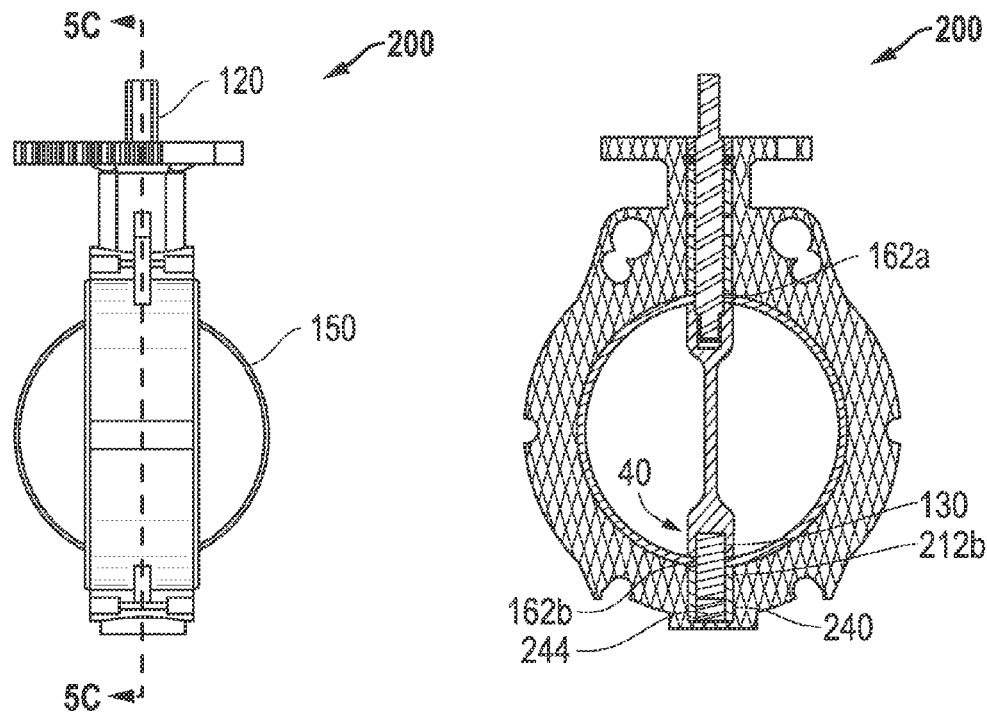
*FIG. 5B*
*FIG. 5C*
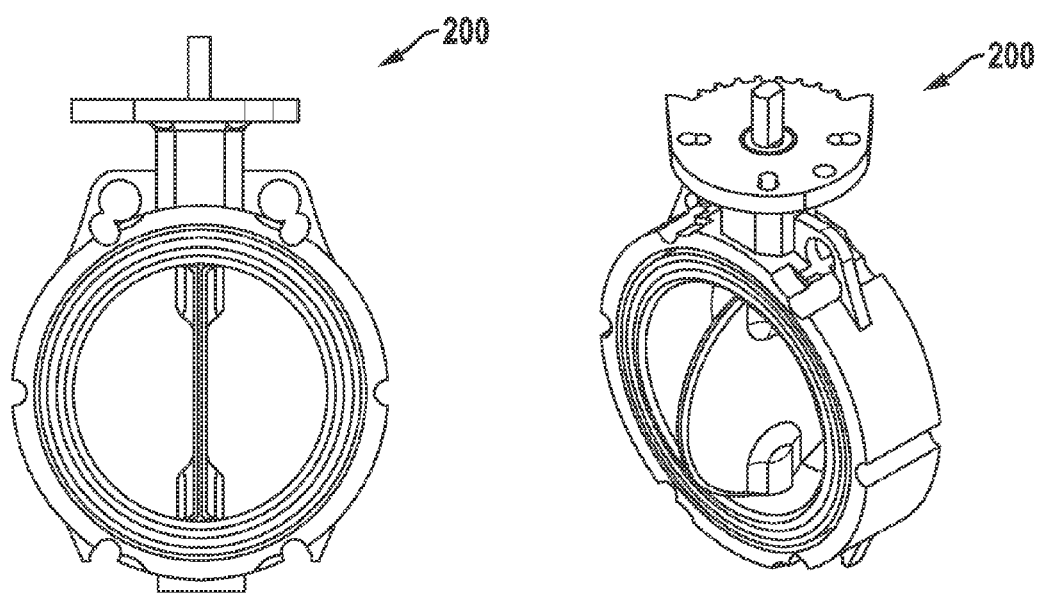
*FIG. 5D*
*FIG. 5E*

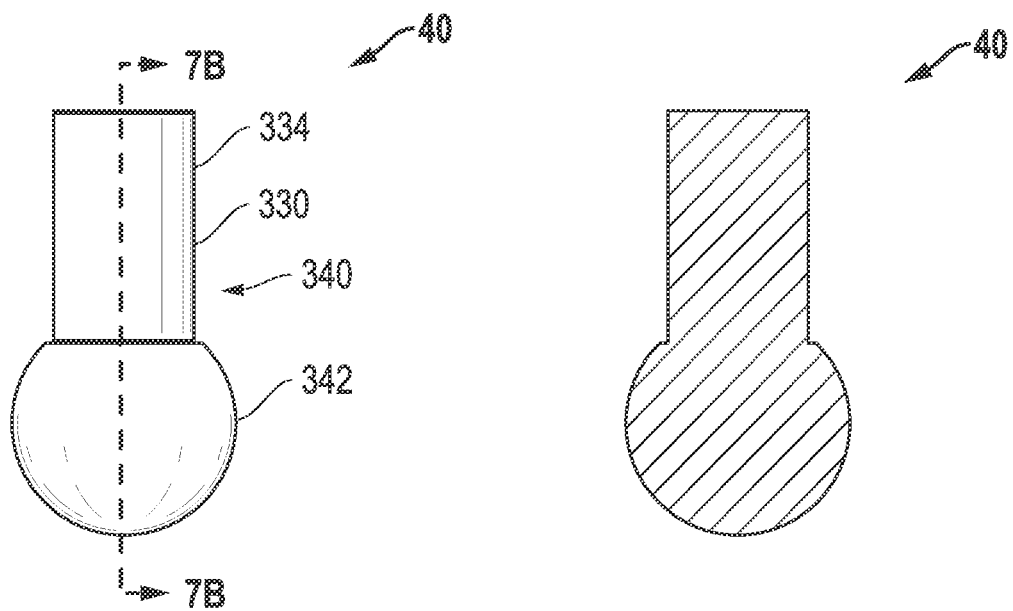
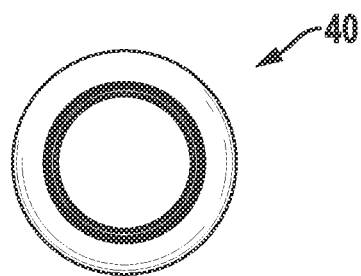
FIG. 7A  FIG. 7B
FIG. 7C

BUTTERFLY VALVE ASSEMBLY

STATEMENTS REGARDING FEDERALLY SPONSORED RESEARCH OR DEVELOPMENT

Not Applicable.

NAMES OF THE PARTIES TO A JOINT RESEARCH AGREEMENT

Not Applicable.

REFERENCE TO A "SEQUENCE LISTING", A TABLE, OR A COMPUTER PROGRAM

Not Applicable.

BACKGROUND

Conventional disc and stem butterfly valve throttling assemblies are typically one-piece disc stem models, two-piece through-stem models, or three-piece disc and upper/lower stem models, all which possess certain disadvantages. To note, one-piece disc stem butterfly valve assemblies are limited to construction with one type of material which may not be ideal for all the different parts and functions of the device, and are difficult and expensive to manufacture and repair. These conventional one-piece models are not preferred in many industries, such as the trucking or vehicular industry. Two-piece models, while allowing for the stem and disc to be constructed of different materials, are often cumbersome to assemble, lower flow volume, and, like the one-piece models, also suffer from complicated and expensive repairs. The conventional three-piece design has all the advantages of the one-piece and two-piece models, but is still expensive to manufacture and repair or difficult to disassemble for repair depending upon the particular design. Some of these conventional designs may also require external openings on the valve body to aid in lower stem installation or retention, which results in an additional source for corrosion, entry points for contaminates, and increased difficulties for repair.

Thus, there is a need for functional multiple-piece disc and stem embodiments which allow the use of dissimilar materials for stem and disc components; enable the stem component to be made of a stronger and/or more economical material than the disc component; are rebuildable; and, also allow for easy disassembly for replacement of wear components.

BRIEF SUMMARY OF THE EMBODIMENTS

A solid body resilient seated butterfly valve that has a thin disc, no hardware in the flow path; is readily rebuildable and is sealed from the environment; and achieved by means of a disc that is tiltable (and in some embodiments pivotable) into place. The valve assembly has a valve body, a lower bushing, a valve seat, a lower stem, a disc, and an upper stem. The valve body defines a bi-directional flow path therethrough; wherein the valve body has an inner surface, two flange faces, and further defines an upper orifice and a hemispherical lower orifice along an axis perpendicular to the flow path. The lower bushing is housed in the lower orifice, and the lower bushing is configured to tilt within the lower orifice away from the axis. The lower bushing defines a bushing cavity. The valve seat has an outer surface configured to encapsulate the inner surface and the two flange faces of the valve body. The lower stem is housed in the bushing cavity, and the lower stem is configured for tilting away from and towards the axis perpendicular to the flow path. The disc has a seating surface on at outer circumference, defines a stem receptacle to house the lower stem, and the stem receptacle extends less than a diameter of the disc.

While the embodiments herein describe parts and/or features of the butterfly valve assemblies with the terms "upper" and "lower" with respect to a notch or top plate, it is to be appreciated that the embodiments are not limited to one orientation and may be rotated, oriented or flipped at any angle. By way of example only, but not limited to, the notch or top plate may be oriented towards the ground, and a lower stem and a lower bushing may be physically upwards. Likewise, the notch or top plate may be oriented laterally. The nomenclature as written and shown herein remains unchanged in the foregoing examples. Therefore, the terms "upper" and "lower" as used herein are intended to cover all other orientations even when the parts and/or features are not truly in practice "upper" and/or "lower".

BRIEF DESCRIPTION OF THE SEVERAL VIEWS OF THE DRAWINGS

The embodiments may be better understood, and numerous objects, features, and advantages made apparent to those skilled in the art by referencing the accompanying drawings. These drawings are used to illustrate only typical embodiments of this invention, and are not to be considered limiting of its scope, for the invention may admit to other equally effective embodiments. The figures are not necessarily to scale and certain features and certain views of the figures may be shown exaggerated in scale or in schematic in the interest of clarity and conciseness.

FIG. 5B depicts a side assembled view (partially showing hidden lines) of a "spring stem" alternative embodiment of a butterfly valve assembly.

FIG. 5C depicts a cross sectional assembled view of a "spring stem" embodiment of a butterfly valve assembly in an open position along line 5C-5C of FIG. 5B.

FIG. 5D depicts a front assembled view of a "spring stem" alternative embodiment of a butterfly valve assembly.

FIG. 5E depicts a perspective assembled view of a "spring stem" alternative embodiment of a butterfly valve assembly.

FIG. 7A depicts a side view of one embodiment of a ball end stem.

FIG. 7B depicts a cross section view of an embodiment of a ball end stem along line 7B-7B of FIG. 7A.

FIG. 7C depicts a top view of an embodiment of a ball end stem.

DETAILED DESCRIPTION OF EMBODIMENT(S)

Figure 1:
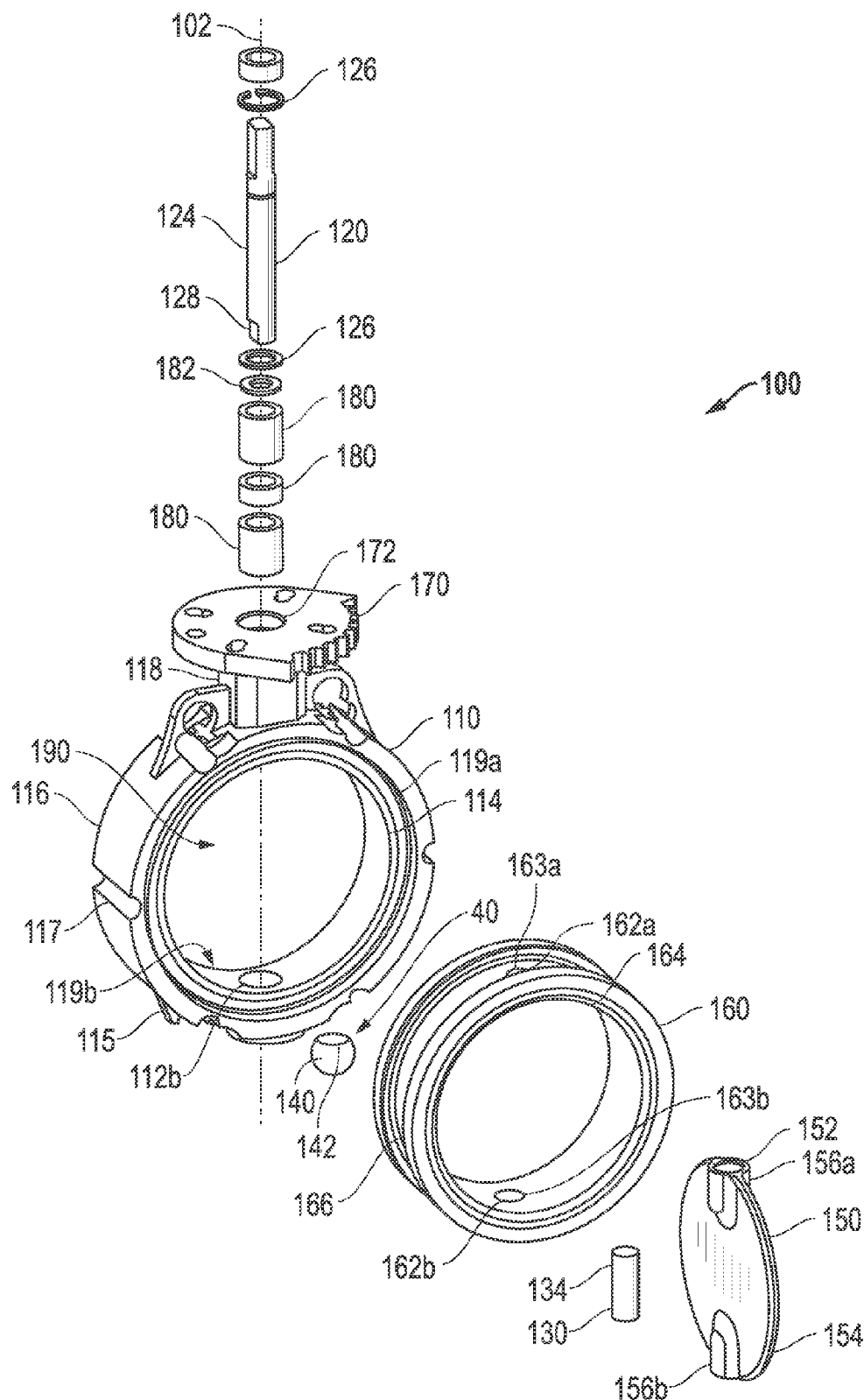
FIG. 1 depicts a perspective exploded view of an embodiment of a butterfly valve assembly.
Figure 2:
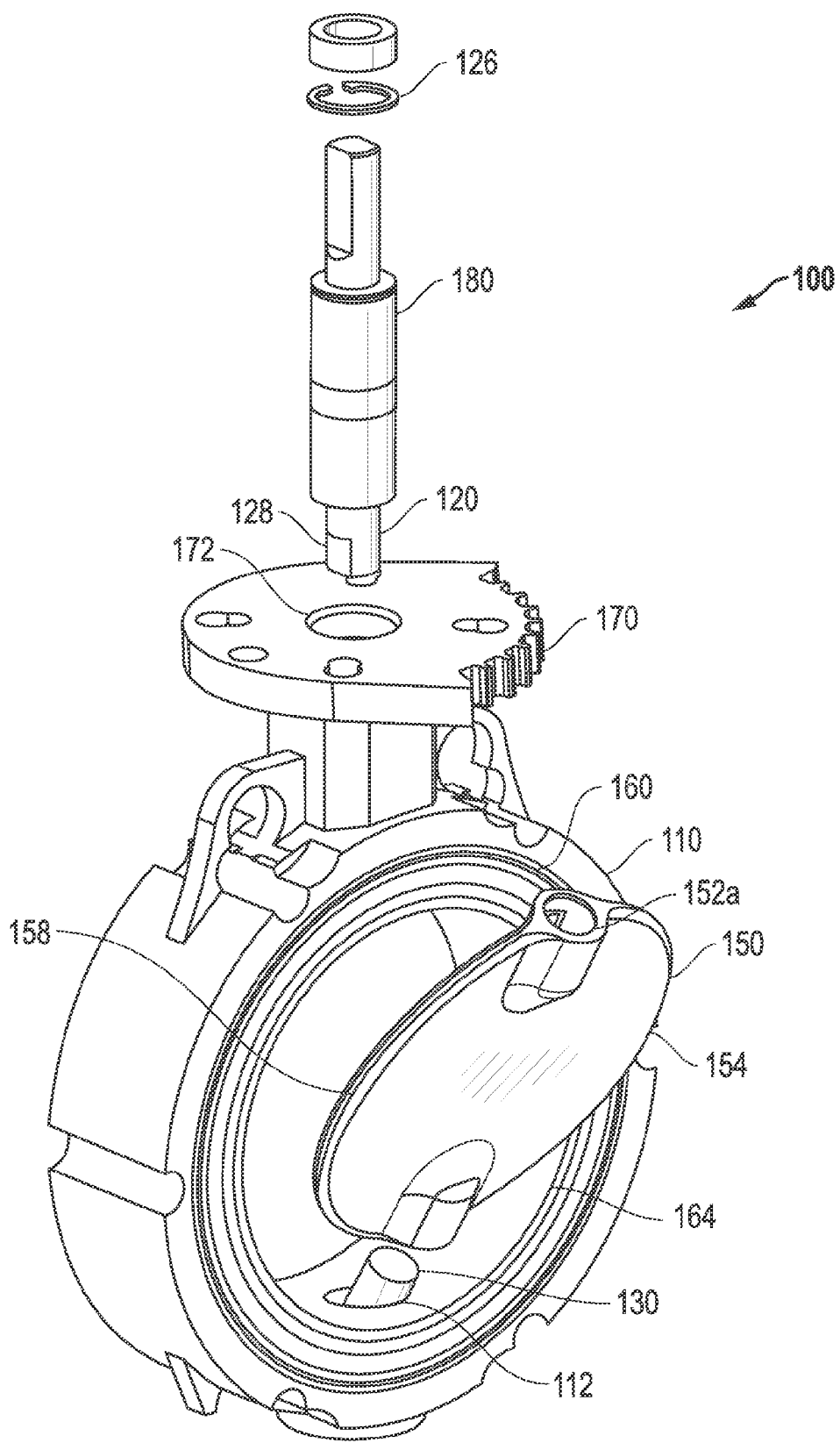
FIG. 2 depicts a perspective partially exploded view of an embodiment of a butterfly valve assembly.
Figure 3A:
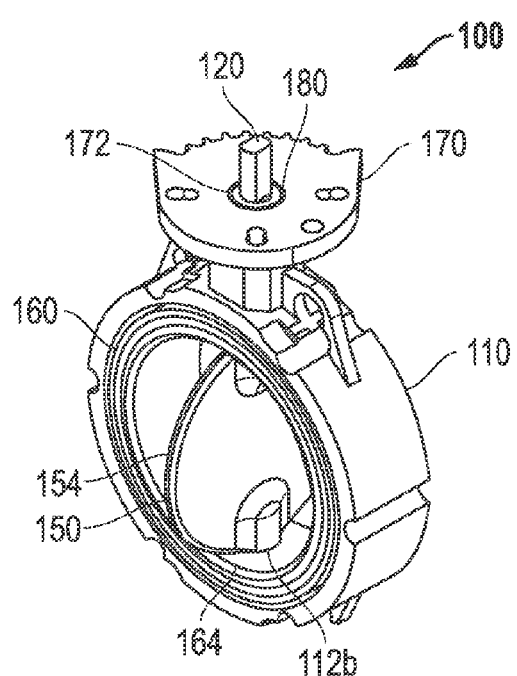
FIG. 3A depicts top perspective assembled view of an embodiment of a butterfly valve assembly in an open position.
Figure 3B:
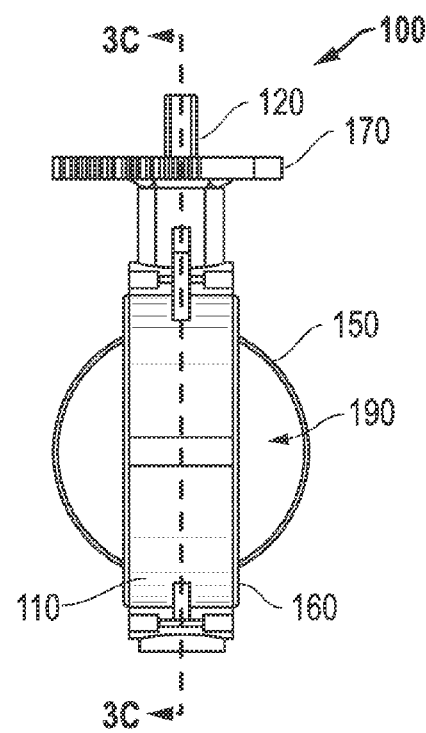
FIG. 3B depicts a side assembled view (partially showing hidden lines) of an embodiment of a butterfly valve assembly in an open position.
Figure 3C:
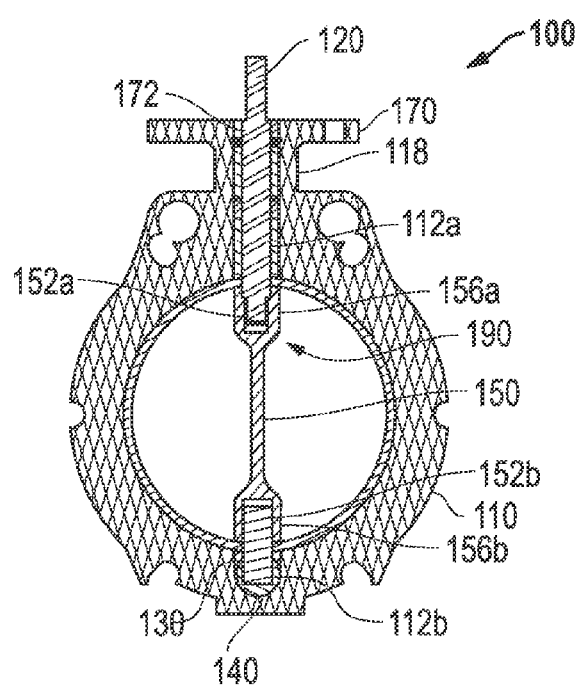
FIG. 3C depicts a cross sectional assembled view of an embodiment of a butterfly valve assembly in an open position along line 3C-3C of FIG. 3B.
Figure 3D:
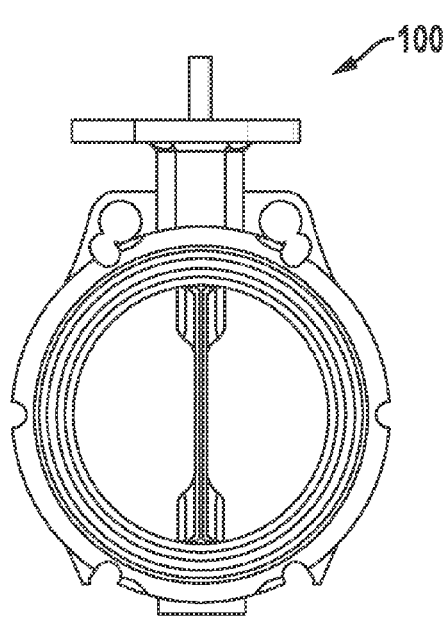
FIG. 3D depicts a front assembled view of an embodiment of a butterfly valve assembly in an open position.

The description that follows includes exemplary apparatus, methods, techniques, and instruction sequences that embody techniques of the inventive subject matter. However, it is understood that the described embodiments may be practiced without these specific details.

One embodiment of the butterfly valve assembly 100 is depicted in FIGS. 1, 2, 3A-D, and 12. In butterfly valve assembly 100, a flow-path or bi-directional flow path 190 flows through a one-piece valve body 110 which has a valve body inner surface 114 and two flange faces 119a and 119b located on opposite sides of the valve body 110 adjacent the valve body inner surface 114. The one-piece valve body 110 has no counterbores and preferably defines an inner diameter of constant length. The one-piece valve body 110 further defines valve body upper and lower orifices 112a and 112b arranged respectively at the top and bottom of the valve body inner surface 114, each orifice 112 diametrically across from the other. Valve body lower orifice 112b may be machined or formed into the valve body 110, and does not open to the valve body outer surface 116 in the preferred embodiments (i.e. the valve body lower orifice 112b is formed on the internal or valve body inner surface 114 and terminates in depth prior to emerging at the external or valve body outer surface 116). Valve body upper orifice 112a is also machined into the valve body 110 and runs through a neck 118 and notch plate 170. The neck 118 is connected to the notch plate 170, which defines a notch plate aperture 172. Valve body upper orifice 112a and notch plate aperture 172 are of a diameter sufficient to allow upper bushing 180 and an upper stem 120 to pass there through. The neck 118 and notch plate 170, as depicted in a preferred embodiment although not limited to in other embodiments, are unitary with the valve body 110. Although the notch plate 170 is depicted with a span of ninety (90) degrees of notch plate 170 teeth or notch plate 170 notches, the notch plate 170 may have any span of degrees of such teeth or notches as necessary, including but not limited to one hundred and eighty (180) degrees. Valve body 110 may also be manufactured with alignment ears 115 and valve body notches 117 for the purpose of alignment within the flow system.

The one-piece valve seat 160 is made of any suitable flexible material known to one having ordinary skill in the art. The valve seat 160 is one-piece, has no counterbores, preferably defines an inner diameter of constant length, and has a valve seat outer surface 166 which forms a fluid-tight seal with (i.e. encapsulates) the valve body inner surface 114 when assembled. Furthermore, valve seat 160 may also wrap around valve body inner surface 114 to fully or partially encapsulate the flange faces 119a and 119b of the valve body 110, acting as a sealing gasket against the mating flange (not shown). This particular model of valve seat 160 is commonly referred to in the industry as a 'boot seat' design. Valve seat 160 also defines valve seat upper and lower stem openings 162a and 162b, the centers of which correspond respectively to the centers of valve body upper and lower orifices 112a and 112b to allow upper stem 120 and lower stem 130 to pass therethrough. An axis 102 defines the longitudinal axis for which the centers of valve seat openings 162, valve body orifices 112, and notch plate aperture 172 align along.

Figure 4C:
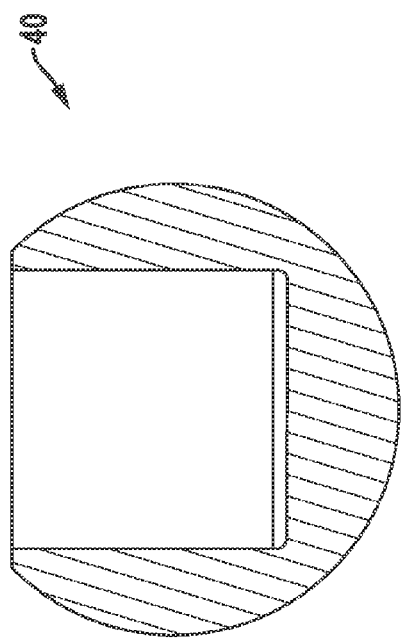
FIG. 4C depicts a cross section view of an embodiment of a ball shaped lower bushing along line 4C-4C of FIG. 4B.
Figure 4B:
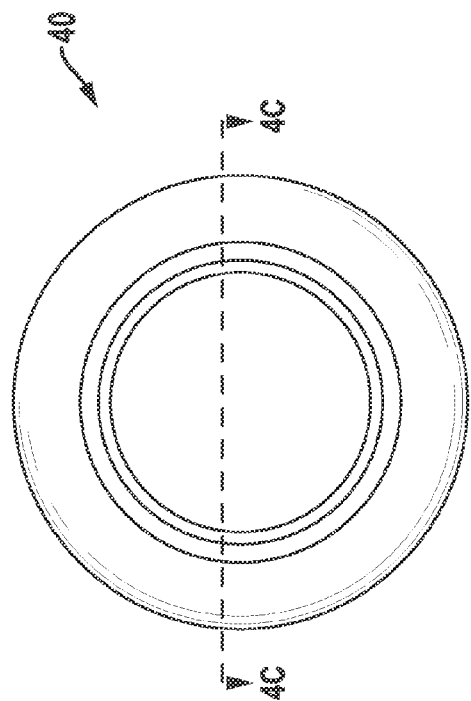
FIG. 4B depicts a top view of one embodiment of a ball shaped lower bushing.
Figure 4A:
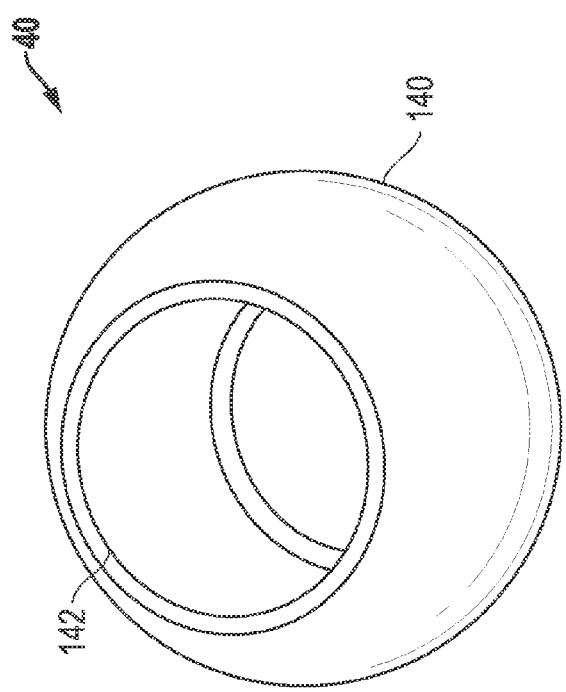
FIG. 4A depicts a perspective view of one embodiment of a ball shaped lower bushing.
Figure 5A:
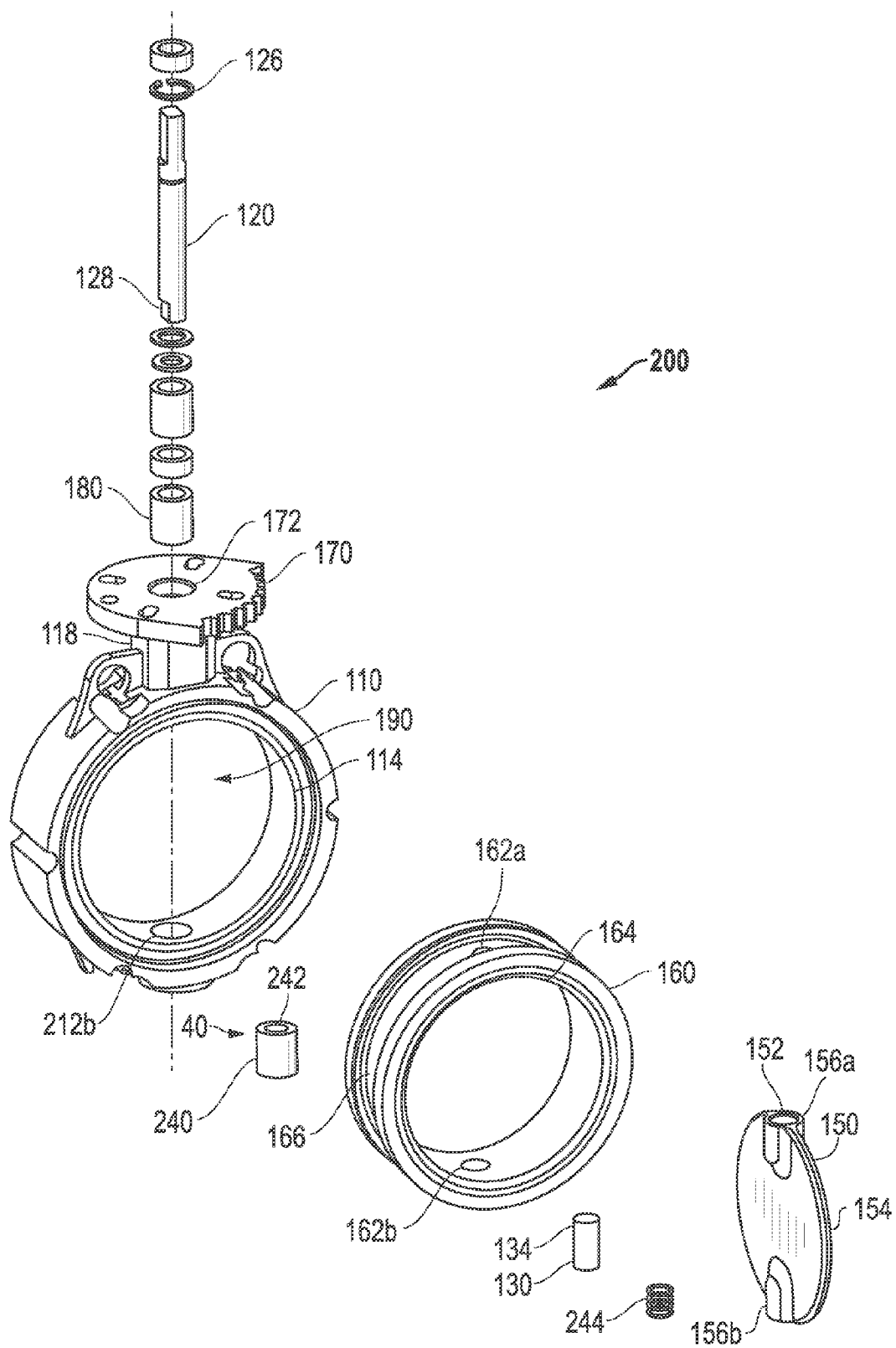
FIG. 5A depicts a perspective exploded view of a "spring stem" alternative embodiment of a butterfly valve assembly.
Figure 6A:
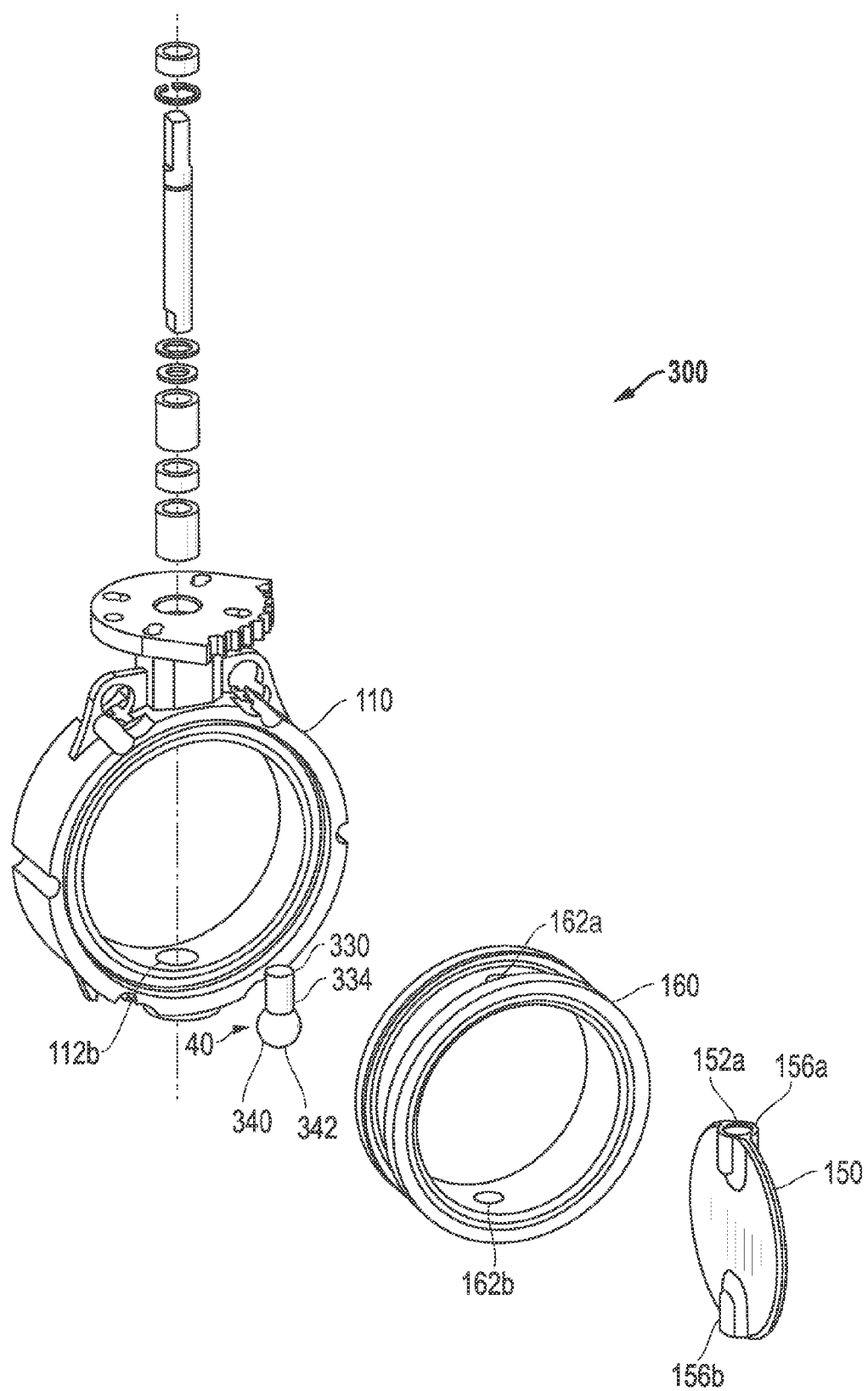
FIG. 6A depicts a perspective exploded view of a "ball end stem" alternative embodiment of a butterfly valve assembly.
Figures 6B, 6C:
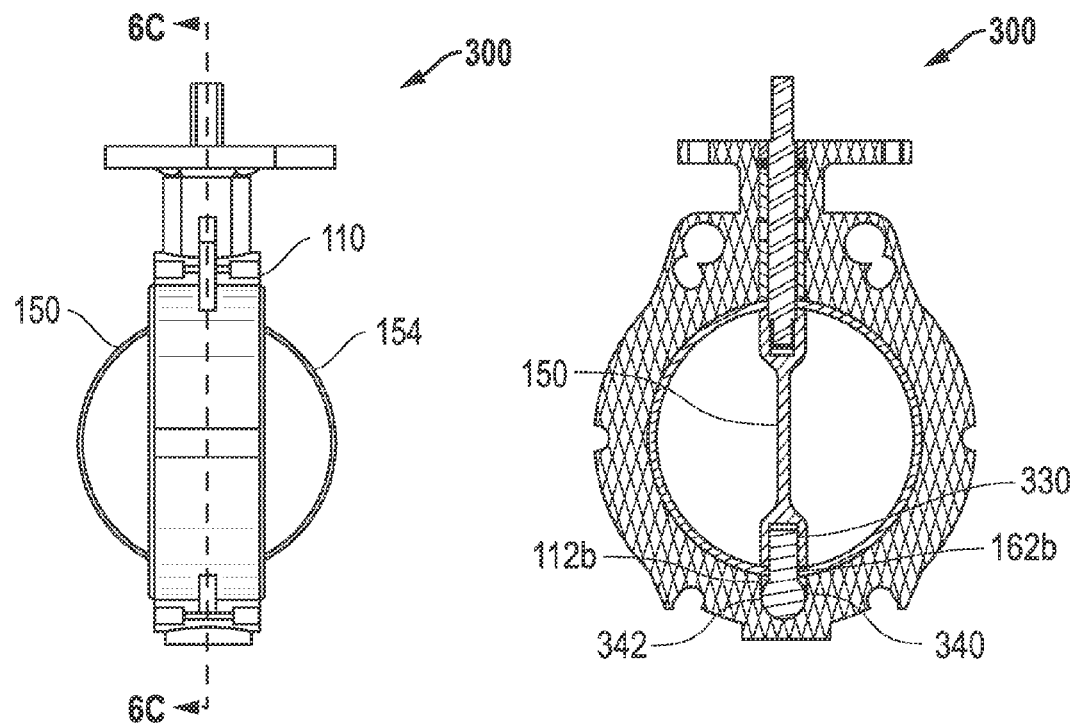
FIG. 6B depicts a side assembled view (partially showing hidden lines) of a "ball end stem" alternative embodiment of a butterfly valve assembly.
FIG. 6C depicts a cross sectional assembled view of a "ball end stem" embodiment of a butterfly valve assembly in an open position along line 6C-6C of FIG. 6B.
Figures 6D, 6E:
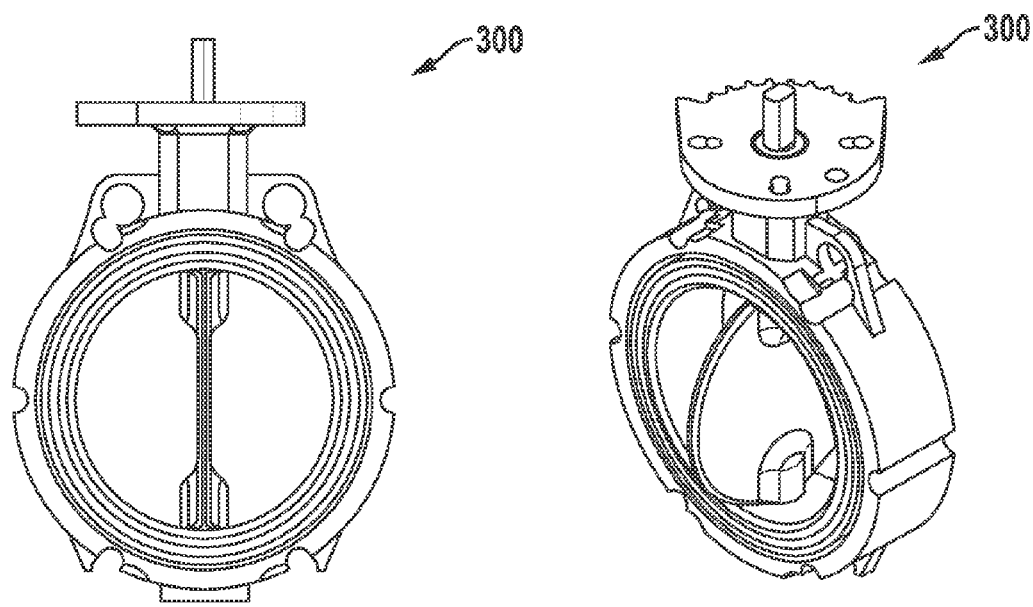
FIG. 6D depicts a front assembled view of a "ball end stem" alternative embodiment of a butterfly valve assembly.
FIG. 6E depicts a perspective assembled view of a "ball end stem" alternative embodiment of a butterfly valve assembly.
Figure 8A:
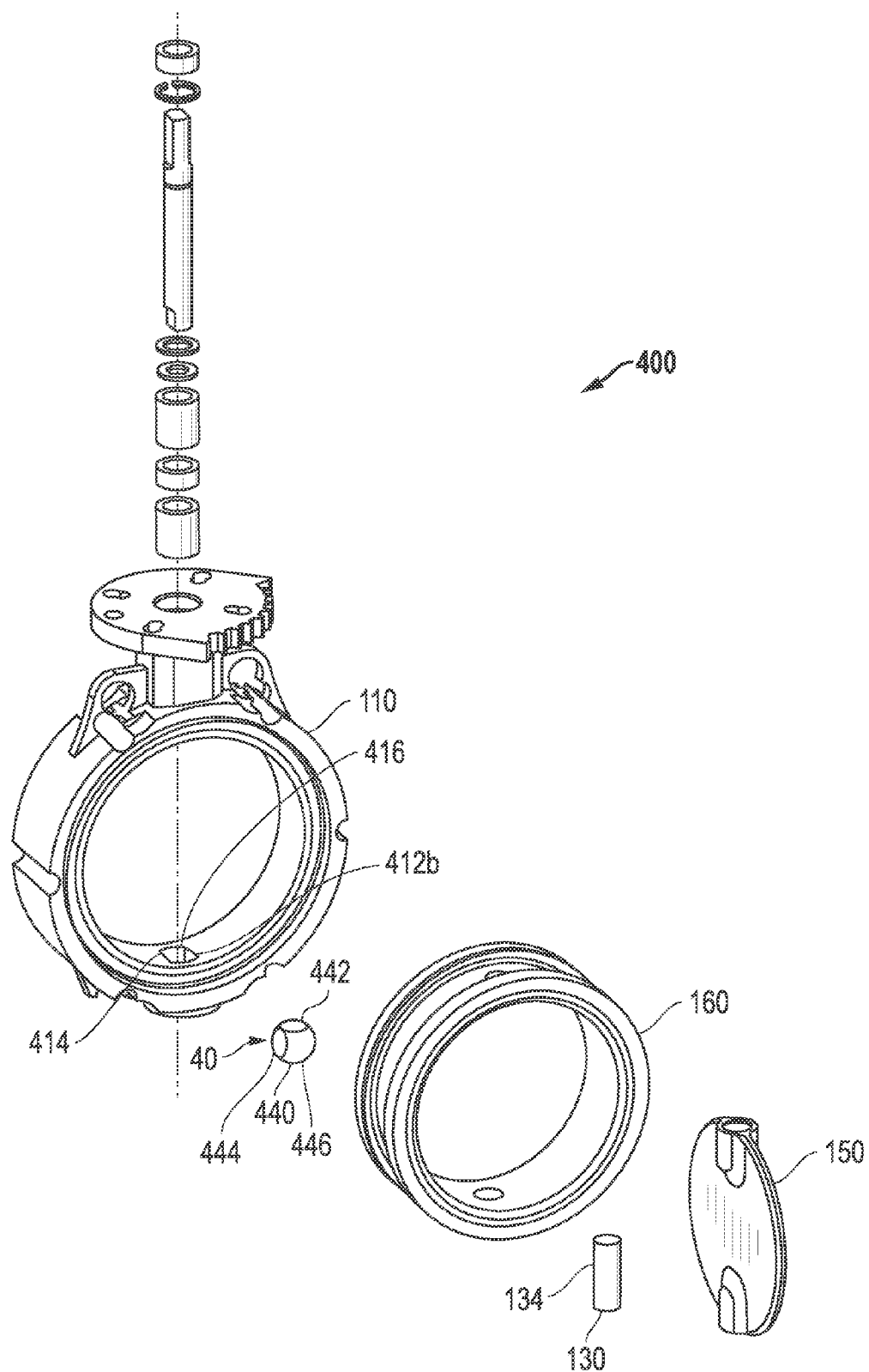
FIG. 8A depicts a perspective exploded view of a "flat bushing" alternative embodiment of a butterfly valve assembly.
Figure 8B:
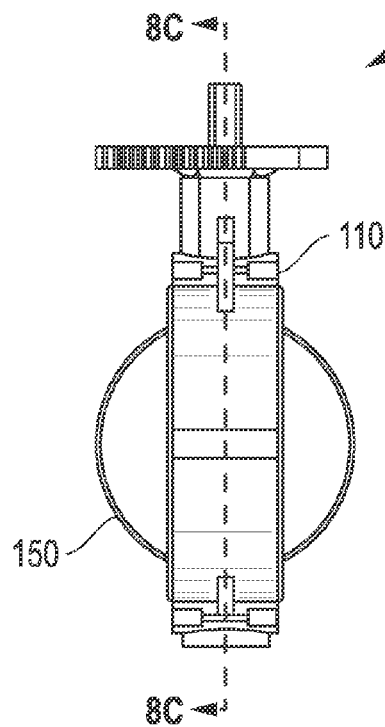
FIG. 8B depicts a side assembled view (partially showing hidden lines) of a "flat bushing" alternative embodiment of a butterfly valve assembly.
Figure 8C:
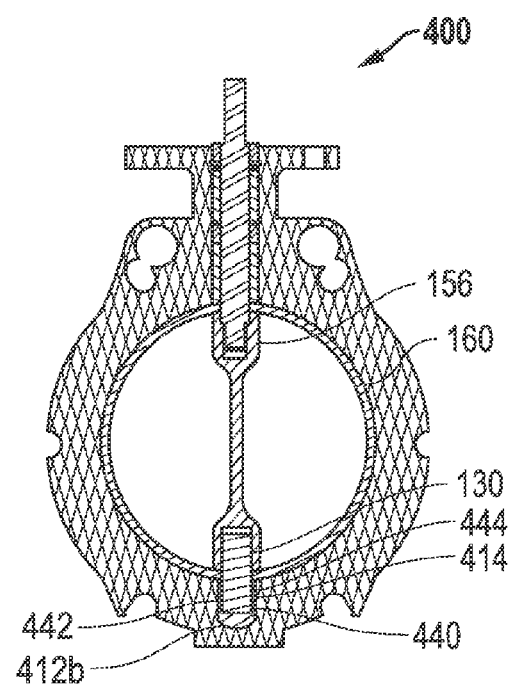
FIG. 8C depicts a cross sectional assembled view of a "flat bushing" embodiment of a butterfly valve assembly in an open position along line 8C-8C of FIG. 8B.
Figure 8D:
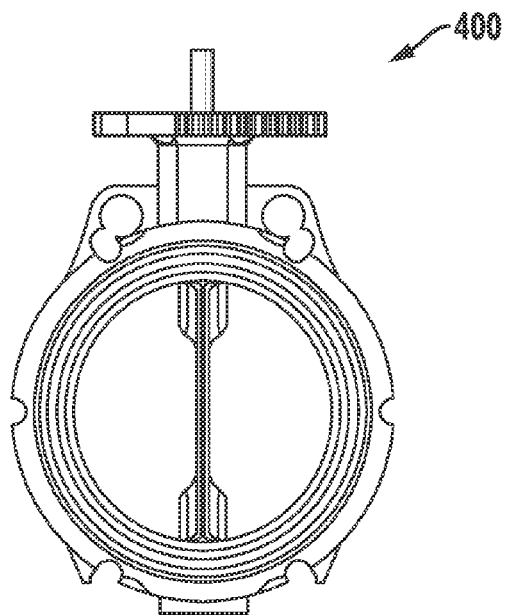
FIG. 8D depicts a front assembled view of a "flat bushing" alternative embodiment of a butterfly valve assembly.
Figure 8E:
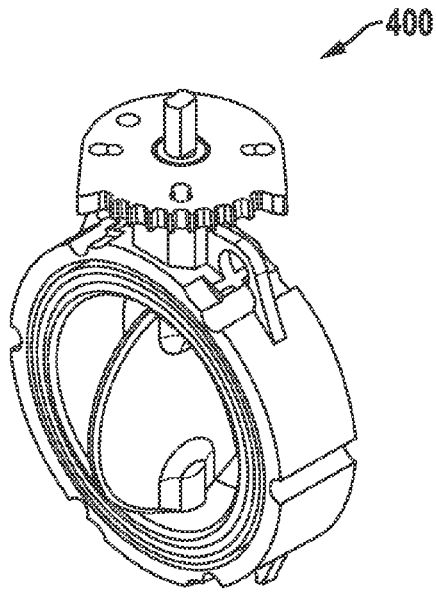
FIG. 8E depicts a perspective assembled view of a "flat bushing" alternative embodiment of a butterfly valve assembly.
Figure 9A:
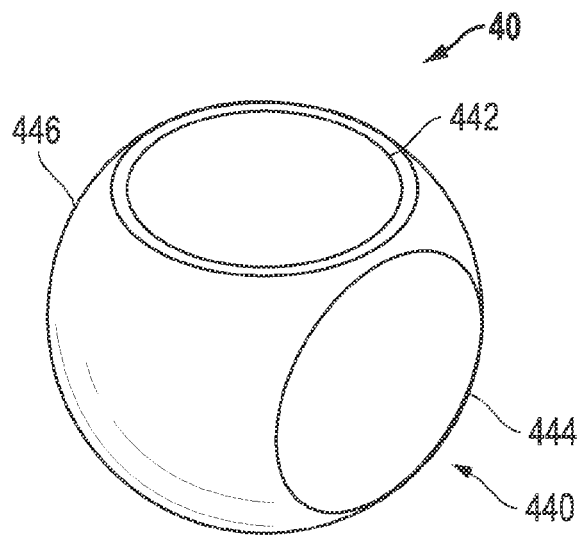
FIG. 9A depicts a perspective view of one embodiment of a flat bushing.
Figure 9B:
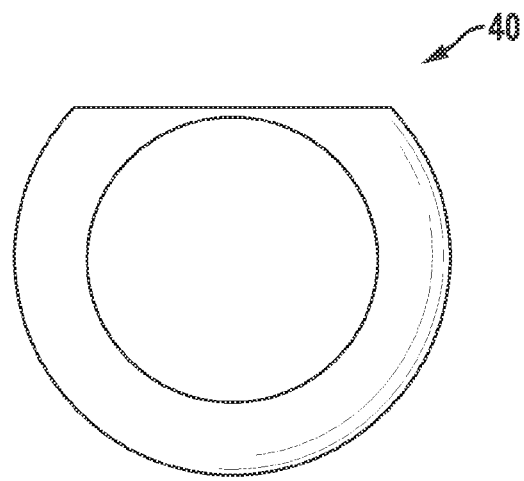
FIG. 9B depicts a side view of one embodiment of a flat bushing.
Figure 9C:
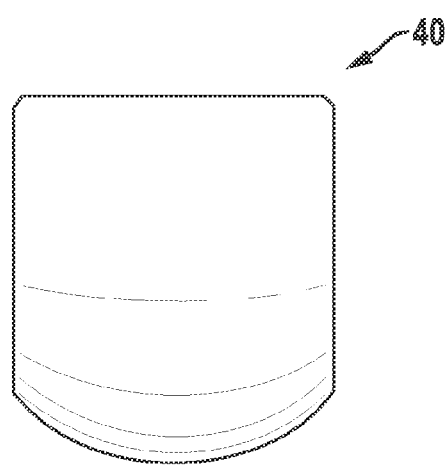
FIG. 9C depicts a front view of one embodiment of a flat bushing.
Figure 9D:
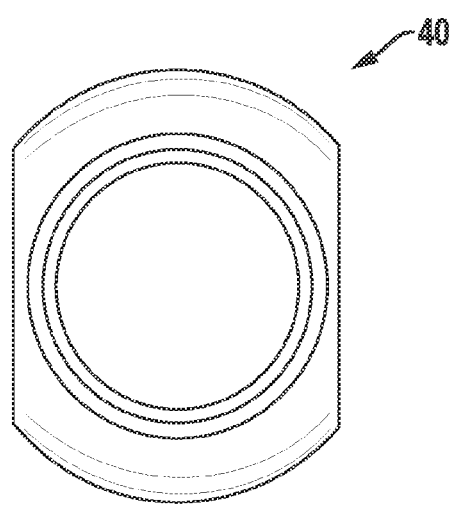
FIG. 9D depicts a top view of one embodiment of a flat bushing.
Figure 10A:
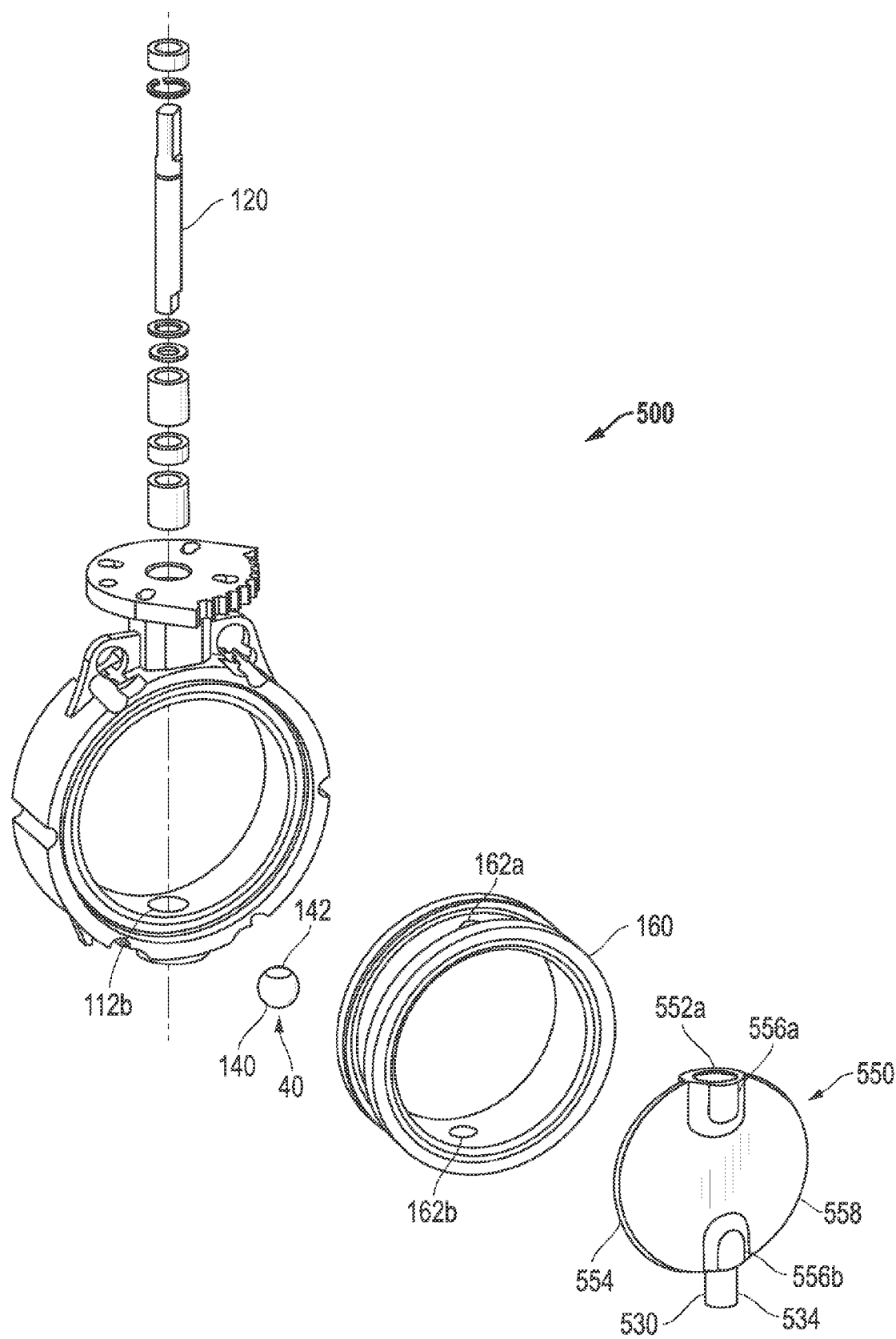
FIG. 10A depicts a perspective exploded view of a unitary disc and lower stem piece alternative embodiment of a butterfly valve assembly.
Figure 10B:
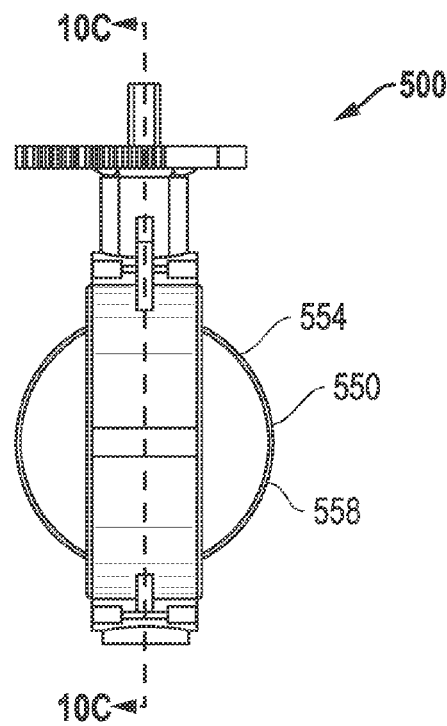
FIG. 10B depicts a side assembled view (partially showing hidden lines) of a unitary disc and lower stem piece alternative embodiment of a butterfly valve assembly.
Figure 10C:
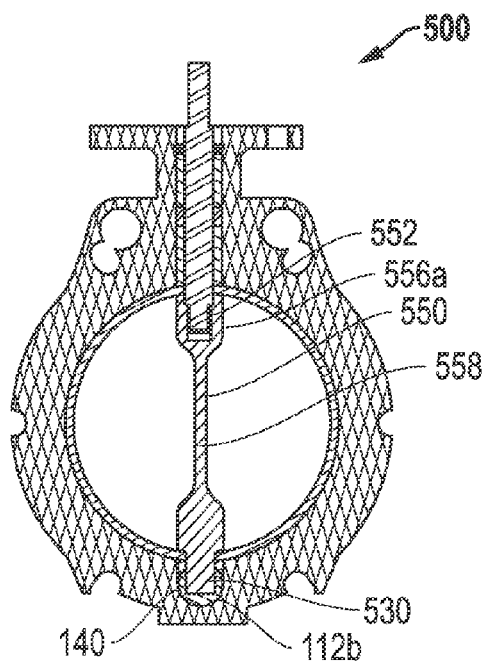
FIG. 10C depicts a cross sectional assembled view of a unitary disc and lower stem piece embodiment of a butterfly valve assembly in an open position along line 10C-10C of FIG. 10B.
Figure 10D:
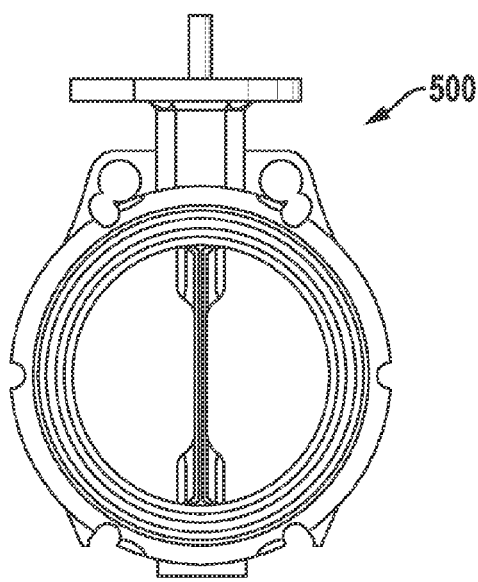
FIG. 10D depicts a front assembled view of a unitary disc and lower stem piece alternative embodiment of a butterfly valve assembly.
Figure 10E:
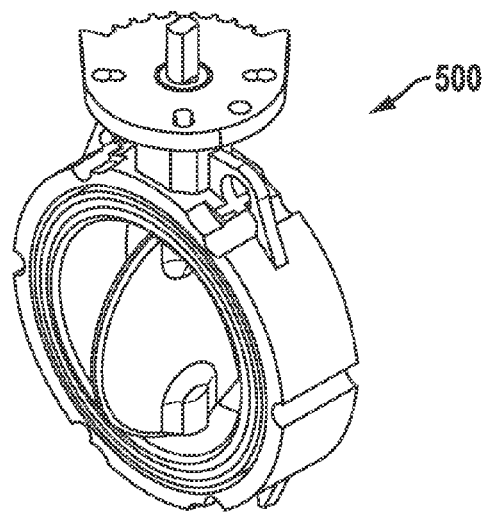
FIG. 10E depicts a perspective assembled view of a unitary disc and lower stem piece alternative embodiment of a butterfly valve assembly.

As illustrated in the embodiment of FIGS. 1, 2, 3A-D, and 12 the valve body lower orifice 112b is configured to house a ball shaped (exterior surface) lower bushing 140 (e.g. defines a hemispherical void within the one-piece valve body 110). A perspective view of ball shaped lower bushing 140 is depicted in FIGS. 4A-C. The ball shaped lower bushing 140 may be constructed out of any suitable material as known to one of ordinary skill in the art including, but not limited to, stainless steel or acetyl. In addition, ball shaped lower bushing 140 defines a bushing cavity 142, which is configured to house a portion of lower valve stem 130. The valve body lower orifice 112b is constructed or formed as a hemispherical void or cavity such that the ball shaped lower bushing 140 can tilt and rotatably maneuver or pivot within the valve body lower orifice 112b. While ball shaped lower bushing 140 is depicted in the form of a sphere and the valve body lower orifice 112b is defined as a hemispherical void (or cylindrical void with hemispherical void at the lower end), it is to be appreciated that the combination of lower bushing 140 and valve body orifice 112b may be in any combination of forms, shapes, or voids capable of swiveling, tilting, or pivoting the lower bushing 140. When the lower stem 130 is inserted into the bushing cavity 142, the rotation or pivoting movement of the ball shaped lower bushing 140 is imparted to the lower stem 130. The interaction between the valve body lower orifice 112b and the ball shaped lower bushing 140 allows the lower stem 130 to pivot and tilt axially away from axis 102 at a variety of different angles, one of which may be seen in FIG. 2. The ends of lower stem 130 may be beveled if so desired (not shown).

The circumference or diameter of valve seat opening for lower stem 162b may be less than the widest circumference or diameter of the ball shaped lower bushing 140. As a result, when valve seat 160 is fitted against the valve body 110, the ball shaped lower bushing 140 is retained in the valve body lower orifice 112b. Further the circumference or diameter of the valve seat lower stem opening 163b may combine into an interference fit, forming a fluid-tight or leak-proof seal with the lower stem outer surface 134. The circumference of the valve seat upper stem opening 163a may also combine into an interference fit forming a fluid-tight or leak-proof seal with the upper stem outer surface 124.

Disc 150 is of a flat, circular shape, of primarily uniform thickness except for upper and lower stem retaining sections 156a and 156b. The thickness of the disc 150 around the stem retaining sections 156 is increased so as to be able to accommodate the housing of upper stem 120 and lower stem 130 in upper and lower stem receptacles 152a and 152b, respectively. Upper and lower stem receptacles 152a and 152b are centered on and concentric with the centerline (pivot axis from edge through center of disc that aligns with axis 102 when the disc 150 is installed) of disc 150. Note that it is not necessary for upper and lower stem receptacles 152 to form a through shaft hole through the disc 150. Each of the upper and lower stem receptacles 152 may extend into the disc only as is deemed necessary by one skilled in the art (by way of example only, but not limited to, within a range of about 1.0 to 2.5 times the diameter of the opening, and in some cases about 1.5 times the diameter). No fasteners are required for the upper and lower stem receptacles 152. This allows the disc to have a slim disc profile (relative to upper stem receptacle 152a and lower stem receptacle 152b) which enhances flow, with much higher CVs. The drive connection between the upper stem 120 and the upper stem receptacle 152a could be any known drive connection such as, for example, a double "D"-type connection, a hex-drive, a splined drive, or a keyed-drive. In addition, although disc 150 is illustrated with a flat, circular shape, it is to be appreciated that any shape of the disc 150 may be used in connection with the disclosed embodiments. The seating surface 158 of the disc 150 is located at or around the external perimeter of the disc 150.

To assemble butterfly valve assembly 100, the ball shaped lower bushing 140 is first inserted into the valve body lower orifice 112b. The valve seat 160 is then fitted into the valve body 110 such that the center of the valve seat opening for the upper stem 162a and the center of valve seat opening for the lower stem 162b are aligned with axis 102. The valve seat 160 can be installed in the valve body 110 from either the upstream side or the downstream side of the valve body 110. When the valve seat 160 is installed properly, the valve seat outer surface 166 forms a fluid-tight seal against, i.e. encapsulates the inner diameter or valve body inner surface 114 and the flange faces 119a and 119b of the valve body 110.

Then, one end of the lower stem 130 is inserted (or pushed because the valve seat 160 seals against the lower stem 130) through the valve seat opening for lower stem 162b into the bushing cavity 142. From there, the lower stem 130 can be tilted and/or pivoted away from axis 102 (by force as the flexible valve seat 160 offers some resistance) and the opposite end of lower stem 130 can be inserted into lower stem receptacle 152b of disc 150. In an alternate way to install the lower stem 130 and disc 150, one end of lower stem 130 can be first inserted into the lower stem receptacle 152b of disc 150. Then, the opposite end of lower stem 130 is axially, pivotably, or tiltably inserted into the valve seat opening for the lower stem 162b and into the bushing cavity 142.

The disc 150 can then be axially tilted towards axis 102 such that the center of the bore of upper stem receptacle 152a aligns with the centers of valve body upper orifice 112a and valve seat opening for upper stem 162a and the axis 102 (the ball shaped lower bushing 140, lower stem 130 and disc 150 can all be tilted greater than 0° and less than 90° away from the axis 102 in any direction away from the axis 102). The upper stem 120 is then inserted through an upper bushing 180, notch plate aperture 172, neck 118, valve body upper orifice 112a and valve seat opening for upper stem 162a into the upper stem receptacle 152a of disc 150. Note that the upper stem 120 may feature any number of surfaces, splines, torque transmitting or flat surfaces 128 and may be in any shape. As shown in the FIG. 1 embodiment, but not limited to, the flat surfaces 128 matingly correspond to the shape of upper stem receptacle 152a within disc 150 to form a drive connection such that when the upper stem 120 is actuated or rotated, the motion is transferred to the disc 150, and thus the disc 150 correspondingly rotates. The disc 150 seals in both directions (downstream and upstream) along the seating surface 158 against the valve seat 160 as the valve seat 160 is of constant inner diameter. Rotation of the upper stem 120 may be accomplished by an actuator (not depicted), of any type best determined by one of ordinary skill in the art, including, but not limited to: a manual, electric, or pneumatic type actuator. A notch plate 170 may be used in connection with an actuator so that the butterfly valve assembly 100 may be set into an open, closed, or partially open position, as is known in the art. Further, additional bushings 182 or washers, retainers, O-rings, or packing rings 126 may be mounted around upper stem 120. As examples, washers, retainers, O-rings, or packing rings 126 may be made of steel or acetyl, but are not limited to as such.

The use of the pivotable and/or axially tiltable lower stem 130 enables the use of a one-piece, unitary valve body 110, which is stronger, more economical to manufacture, and preferred in many industries. The axially tiltable lower stem 130 eliminates any external openings that result from the use of plugs through which the stem is inserted or roll pins to retain the stems. As a result, use of a one-piece valve body 110 without an external side opening for insertion of lower stem 130 also lowers the potential for corrosion and eliminates entry points for contaminates.

An open position of the butterfly valve assembly 100 is depicted in FIGS. 3A-D, where the disc outer circumference 154 does not lie flush against the valve seat inner surface 164, and fluid may move through the flow path 190. When disc 150 is rotated via the upper stem 120 such that the disc outer circumference 154 lies sealed in a fluid-tight manner against the valve seat inner surface 164 (not shown), then the butterfly valve assembly 100 is in the fully closed position, and the flow path 190 is fully obstructed by disc 150.

FIGS. 5A-E depict a "spring stem" type butterfly valve assembly 200. In the butterfly valve assembly 200, the ball shaped lower bushing 140 is replaced with a spring stem lower bushing 240. Instead of a spherical shape, spring stem lower bushing 240 has a hollow tubular shape, the inside surface of which defines a spring stem bushing cavity 242. The valve body lower orifice 212b is formed in the shape of a cylindrical-shaped void to matingly house the spring stem lower bushing 240. Valve body lower orifice 212b is machined into the valve body 110, and does not open to the valve body outer surface 116. Valve body lower orifice 212b is constructed such that rotational movement of the upper stem 120 and hence the disc 150 about the axis 102 is not inhibited by spring stem lower bushing 240, spring 244, or lower stem 130.

The valve seat 160 is fitted against the valve body 110 such that the valve seat outer surface 166 forms a fluid-tight seal against the valve body inner surface 114 and the flange faces 119a and 119b. The spring 244 is then placed within or encapsulated by the spring stem bushing cavity 242 of spring stem lower bushing 240. As depicted, the spring 244 is a compression coil spring, but spring 244 may be any type of compressible spring or material best known to one of ordinary skill in the art. The lower stem 130 is then placed on top of the spring 244, which is subsequently compressed downwards (hence the lower stem 130 is spring-loaded). The disc 150 is inserted into the valve seat 160 in an orientation which aligns the centers of the upper stem receptacle 152a, the valve seat opening for upper stem 162a, and the lower stem receptacle 152b with the axis 102. When the centers of the valve body lower orifice 212b, valve seat opening for lower stem 162b and lower stem receptacle 152b are aligned with axis 102, the spring 244 decompresses and expands, thus pushing the uppermost portion of the lower stem 130 into the lower stem receptacle 152b. In an alternate way to install lower stem 130 and disc 150, the lower stem 130 may be tilted or pivoted away from axis 102 (by force as the flexible valve seat 160 offers some resistance), and the opposite end of lower stem 130 can be inserted into lower stem receptacle 152b of disc 150. Then, the lower stem 130 and disc 150 may be pivoted into the appropriate position into valve seat 160, wherein the centers of the upper stem receptacle 152a, the valve seat opening for upper stem 162a, and the lower stem receptacle 152b are aligned with the axis 102. After installation of the lower stem 130 and disc 150, the upper stem 120 may then be inserted into the upper stem receptacle 152a of disc 150 and may be rotated or actuated in a similar manner to the butterfly valve assembly 100 embodiment as described for FIGS. 1, 2, 3A-D, and 12.

FIGS. 6A-E depict a "ball end stem" type of butterfly valve assembly 300. In this butterfly valve assembly 300, the ball shaped lower bushing 140 and lower stem 130 from butterfly valve assembly 100 are replaced with an integral, single-piece ball end stem 340. FIGS. 7A-C depict a side view of the ball end stem 340. Ball end stem 340 is constructed with a ball end 342 of ball end stem 340, and stem portion 330 of ball end stem 340. The ball end 342 of the ball end stem 340 is inserted into valve body lower orifice 112b. Valve body lower orifice 112b is machined as a rounded bottom hemispherical void into the valve body 110 to allow rotatable movement of the ball end stem 340. Valve seat 160 is mounted into valve body 110 such that the valve seat opening for the upper stem 162a is aligned with the valve body upper orifice 112a. The valve seat opening for the lower stem 162b is mounted over the stem portion 330 of ball end stem 340 such that the stem portion 330 of ball end stem 340 protrudes therethrough. Further, the circumference of the valve seat lower stem opening 163b may form a fluid-tight seal with the stem portion outer surface 334. The stem portion 330 of ball end stem 340 is capable of rotation and pivotal movement and tilting axially away and towards the axis 102, such that stem portion 330 of ball end stem 340 can be inserted axially into the lower stem receptacle 152b of the disc 150. Assembly of the upper stem 120 into upper stem receptacle 152a of disc 150 is the same as was described for the butterfly valve assembly 100 embodiment.

FIGS. 8A-E depict another embodiment as a "flat bushing" type butterfly valve assembly 400. In the butterfly valve assembly 400, a bushing 440 is configured with rounded sides 446, flats 444, and a flat bushing cavity 442. FIGS. 9A-D depict a side view of the bushing 440. Valve body 110 defines a journal 412b to house bushing 440. Journal 412b is a void machined into the valve body 110, configured with journal rounded surfaces 416 which mate with bushing rounded sides 446, thus enabling axial tilt towards and away from axis 102, along the flow path 190. Further, journal 412b is also configured with journal flat surfaces 414 which mate with bushing flats 444, thus prohibiting rotation around axis 102. The "flat bushing" type butterfly valve assembly 400 could be replaced by other embodiments of bushings such as a cylinder tilting along its rounded side or a bushing having an elliptical profile.

To assemble, the bushing 440 is deposited into the journal 412b such that the bushing rounded sides 446 are adjacent to journal rounded surfaces 416 and the bushing flats 444 are adjacent to journal flat surfaces 414. The valve seat 160 is then inserted into the valve body 110 such that the centers of valve seat opening for the upper stem 162a, the valve body upper orifice 112a, the valve seat opening for the lower stem 162b, and journal 412b are aligned with axis 102.

Then, one end of the lower stem 130 is inserted or pushed through valve seat opening for lower stem 162b into the bushing cavity 442. From there, the lower stem 130 can be tilted away or pivoted away from axis 102 (by force as the flexible valve seat 160 offers some resistance), and the opposite end of lower stem 130 can be inserted into lower stem receptacle 152b of disc 150. In an alternate way to install the lower stem 130 and disc 150, one end of lower stem 130 can be first inserted into the lower stem receptacle 152b of disc 150. Then, the opposite end of lower stem 130 is axially, pivotably, or tiltably inserted into the valve seat opening for the lower stem 162b and into the bushing cavity 442 (the bushing 440, lower stem 130 and disc 150 can all be tilted greater than 0° and less than 90° away from the axis 102 in only two opposite directions, such two directions being aligned with the axis of the flow path). Pivoting the disc 150 such that the upper stem 120 can be inserted into upper stem receptacle 152a of disc 150 of the butterfly valve assembly 400 follows in a similar manner to butterfly valve assembly 100 as described for FIGS. 1, 2, 3A-D, and 12.

Figure 11:
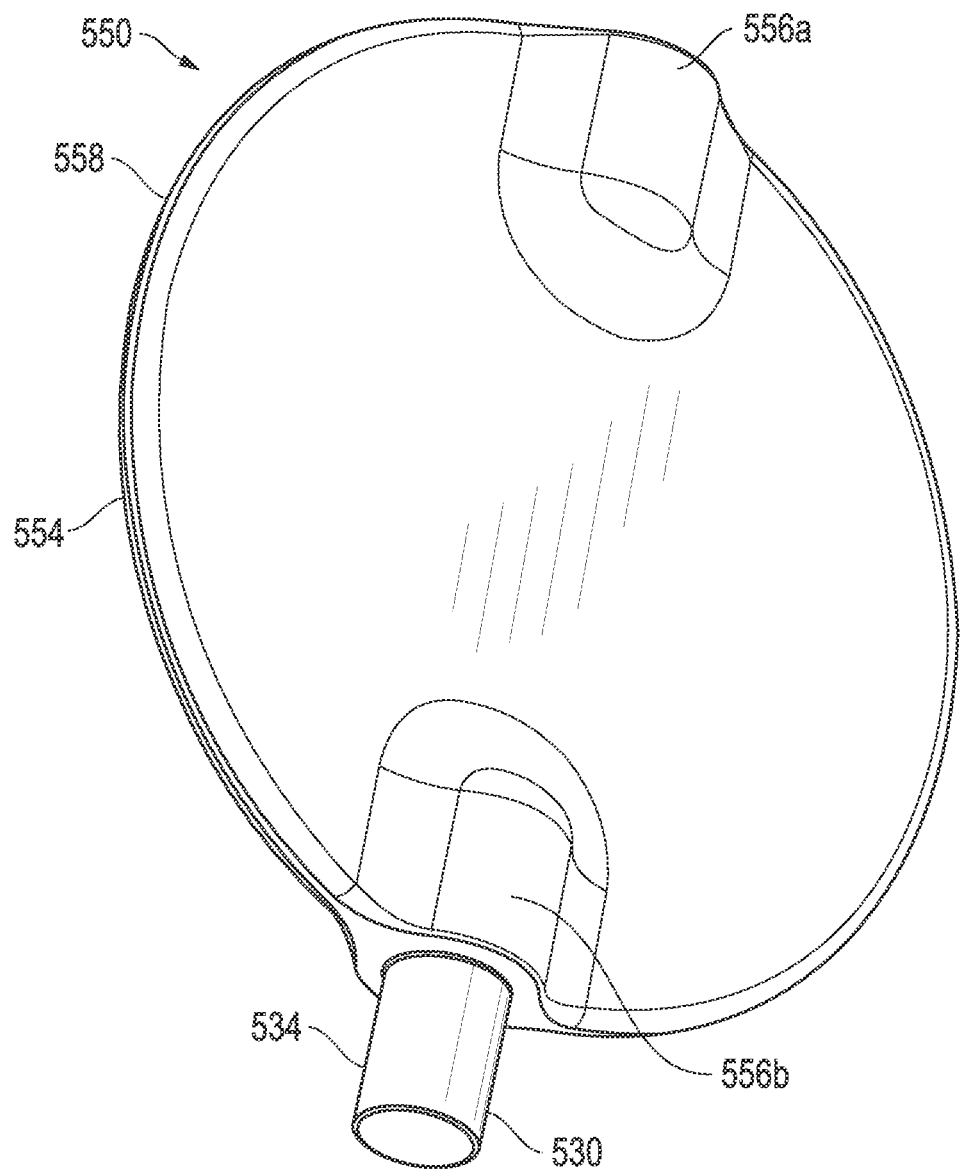
FIG. 11 depicts a perspective view of one embodiment of a unitary disc and lower stem piece.
Figure 12:
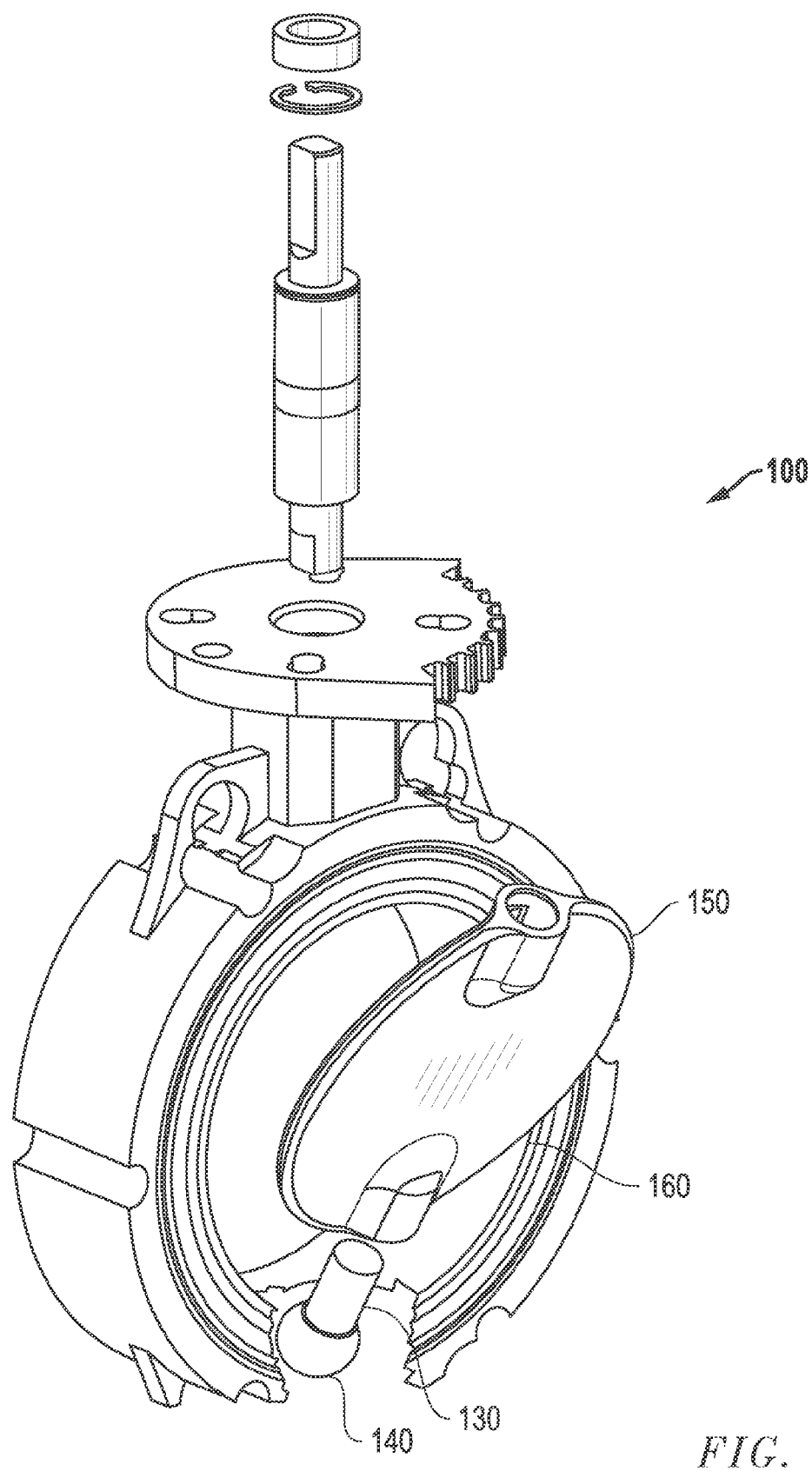
FIG. 12 depicts a perspective partially exploded view of an embodiment of a butterfly valve assembly similar to FIG. 2 but showing a breakaway portion of the valve body in the region of insertion of the ball shaped lower bushing and lower stem.

FIGS. 10A-E depict a unitary disc and lower stem piece embodiment 500 of the butterfly valve assembly. In this unitary disc and lower stem piece embodiment 500, the lower stem 130 and disc 150 of butterfly valve assembly 100 are replaced with an integral, single-piece stem and disc 550 unified or joined at lower stem retaining boss 556b. Integral stem and disc 550 features an Integral disc 558 portion and an Integral stem 530 portion, as depicted in FIG. 11. Integral disc 558 has an outer circumference of 554, configured to sit with a fluid-tight seal against valve seat inner surface 164 when assembled and set into the closed position.

In the unitary disc and lower stem piece embodiment 500, the bushing 40 or ball shaped lower bushing 140 and valve seat 160 are installed much in a similar manner as is depicted in the butterfly valve assembly 100 of FIGS. 1, 2, 3A-D, and 12. Bushing 40 represented here as a ball shaped lower bushing 140 retains the same rotational and pivotal capability as in the butterfly valve assembly 100. After the installation of the ball shaped lower bushing 140 and valve seat 160 into valve body 110, the Integral stem 530 is inserted at an angle tilted or pivoted away from the axis 102 into the bushing cavity 142 of ball shaped lower bearing 140. The circumference of the valve seat lower stem opening 163b may form a fluid-tight seal with the Integral stem outer surface 534. Then, the ball shaped lower bushing 140 and Integral disc and stem 550 can be tilted towards the axis 102 such that center of the upper stem receptacle 552a and upper stem retaining section 556a aligns with the axis 102. In this position, the upper stem 120 is able to pass through the upper bushing 180, a notch plate aperture 172 in the notch plate 170, through the neck 118, the valve body upper orifice 112a and valve seat opening for upper stem 162a into the stem receptacle 552a of Integral stem and disc 550.

Figure 13:
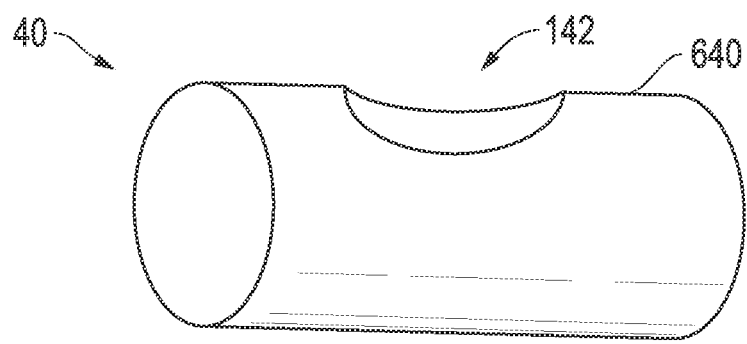
FIG. 13 depicts a perspective view of another embodiment of a bushing as a cylindrical shaped lower bushing.
Figure 14:
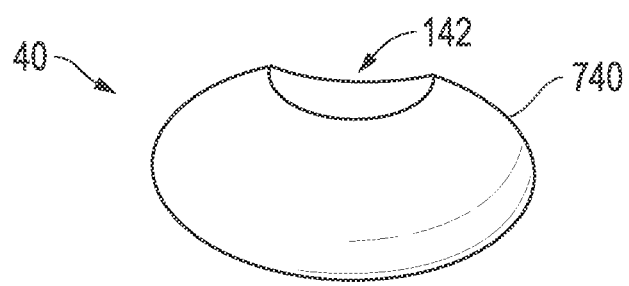
FIG. 14 depicts a perspective view of another embodiment of a bushing as an elliptical-body shaped lower bushing.

Other types or designs of bushings may be implemented. By way of example, FIG. 13 depicts a perspective view of another embodiment of a bushing 40 as a cylindrical shaped lower bushing 640. By way of example, FIG. 14 depicts a perspective view of another embodiment of a bushing 40 as an elliptical-body shaped lower bushing 740. In the foregoing examples, the valve body lower orifice 112b may be modified to house the respective embodiment of bushing 40 to be implemented such that the bushing 40 is capable of swiveling, tilting, or pivoting movement. In use of the term "tilt" or "tilting" the axis of the disc 150, lower stem 130 and/or bushing 40 is tipped or inclined away (see, for example, FIG. 2 and FIG. 12) from its regular axis 102 of rotation/operation as further described above.

While the embodiments are described with reference to various implementations and exploitations, it will be understood that these embodiments are illustrative and that the scope of the inventive subject matter is not limited to them. Many variations, modifications, additions and improvements are possible. For example, the techniques used herein may be applied to any valve used for piping systems.

Plural instances may be provided for components, operations or structures described herein as a single instance. In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the inventive subject matter.

The invention claimed is:

1. A method of assembling a valve assembly, comprising the steps of:
  inserting a lower bushing into a lower orifice formed in a valve body, wherein the lower bushing defines a bushing cavity;
  fitting a valve seat into the valve body, wherein the valve seat defines a lower opening for a lower stem;
  inserting an end of the lower stem through the lower opening and into the bushing cavity;
  inserting a disc via the lower stem; and
  tilting the lower stem and the disc into the valve seat so that the lower stem is in alignment with an axis perpendicular to a flow path.

2. The method according to claim 1, wherein the step of inserting a disc via the lower stem comprises tilting the lower bushing relative to the valve body.

3. The method according to claim 1, further comprising the steps of:
  inserting an upper stem through a neck of the valve body, through an upper opening defined by the valve seat, and into the disc at an end of the disc opposite the lower stem;
  installing a stem retainer; and
  installing at least one upper packing around the upper stem.

4. The method according to claim 3, further comprising the steps of:
  sealingly engaging an outer surface of the lower stem with the lower opening of the valve seat; and
  sealingly engaging an outer surface of the upper stem with the upper opening of the valve seat.

5. The method according to claim 4, further comprising the steps of:
  rotating the upper stem; and
  transmitting the rotational motion of the upper stem to the disc.

6. The method according to claim 5, further comprising the step of sealingly engaging an outer circumference of the disc with the valve seat when the valve assembly is in a closed position.

7. The method according to claim 1, wherein the step of fitting the valve seat into the valve body comprises encapsulating the valve body including two flange faces of the valve body.

* * * * *